June 23, 1964   F. E. A. COGNET ETAL   3,138,659
ANCHORING DEVICE FOR CONTINUOUS SLEEVES
SURROUNDING ELECTRICAL BARS
Filed Oct. 16, 1961   3 Sheets-Sheet 1
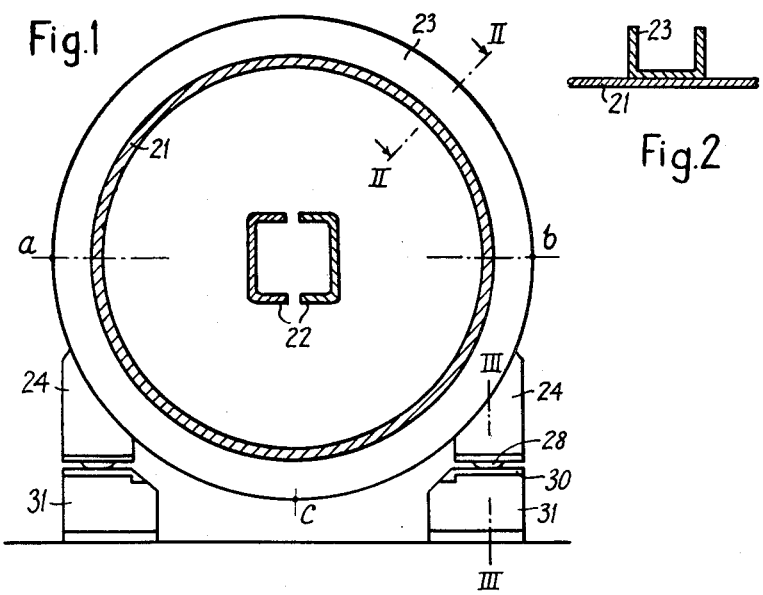
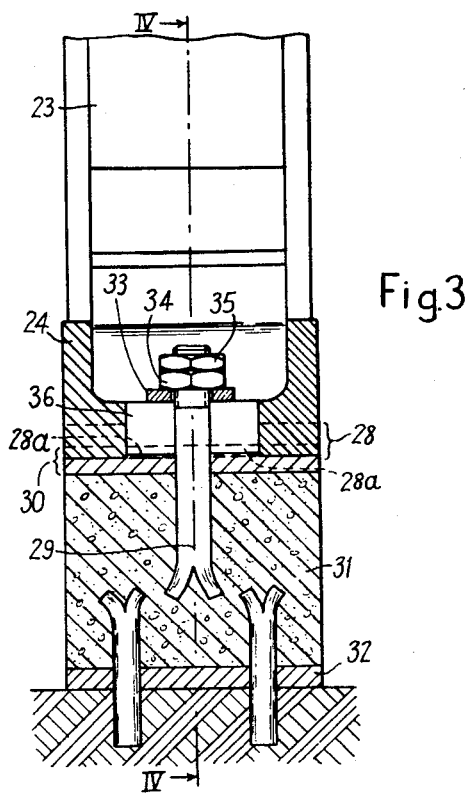
Inventors
F.E.A. Cognet
L.L. Mohier
By
Attorneys

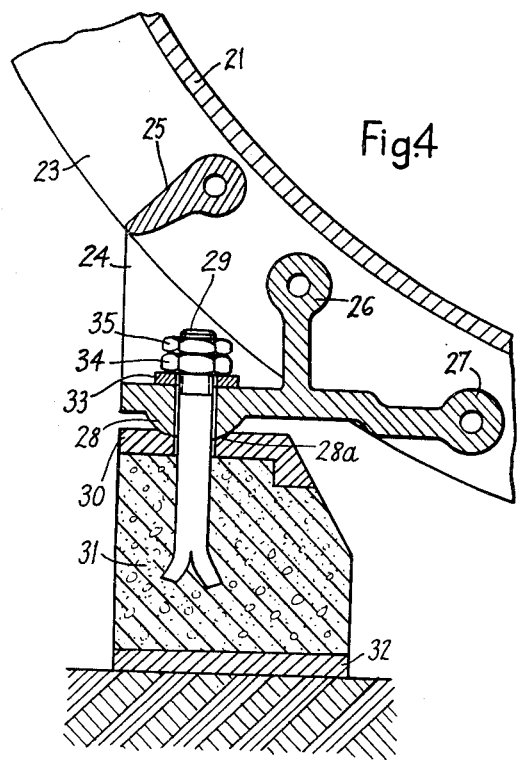
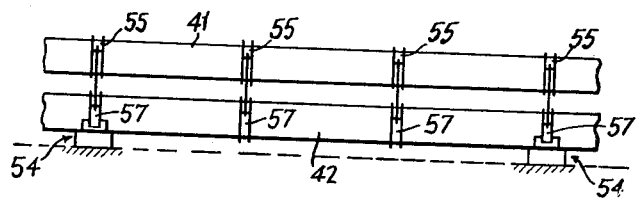

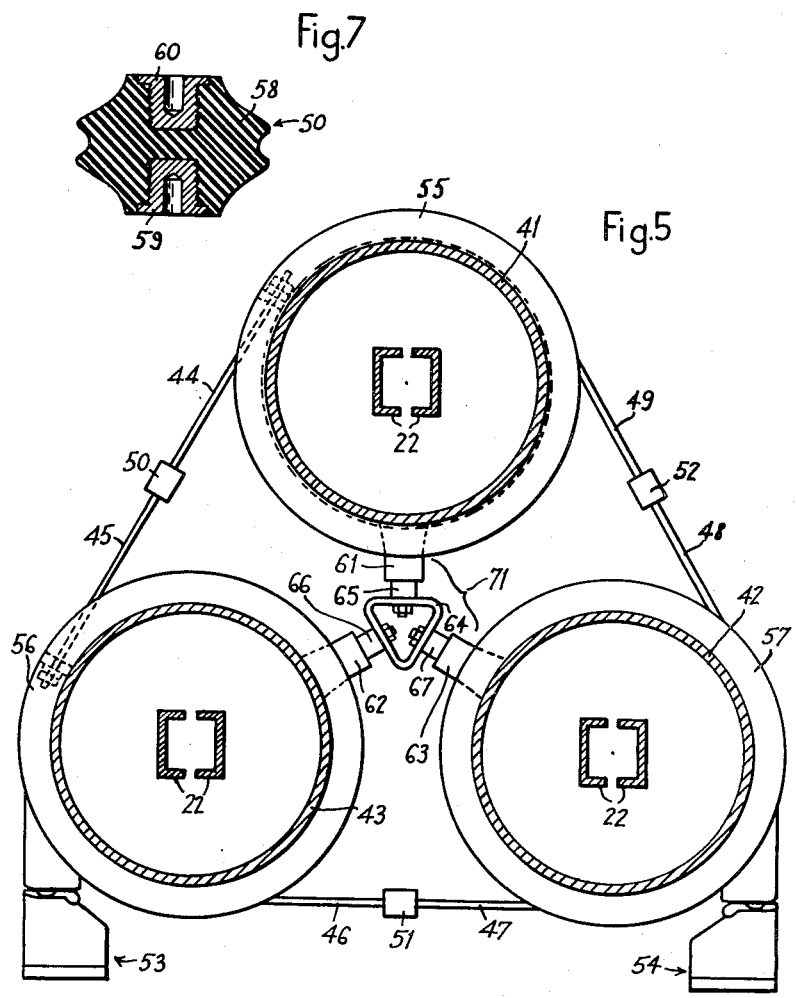

United States Patent Office 3,138,659
Patented June 23, 1964

3,138,659
ANCHORING DEVICE FOR CONTINUOUS SLEEVES SURROUNDING ELECTRICAL BARS
Firmin Eustache Armand Cognet, Paris, and Lucien Leon Mohier, Seine et Oise, France, assignors to Societe Anonyme dite: Societe Generale D'Exploitations Industrielles, Paris, France, a corporation of France
Filed Oct. 16, 1961, Ser. No. 145,139
Claims priority, application France Oct. 19, 1960
4 Claims. (Cl. 174—95)

The present invention relates to an anchoring device for continuous coaxial high-power electrical supply lines that comprise a bar conductor surrounded by a conducting metallic sleeve. The invention may be used for anchoring a hingle bar conductor or a set of three-phase conductors, the individual conductors of the set being arranged in a triangular formation.

The invention has for an object an anchoring device for supporting the sleeve or sleeves, the conductors themselves being fixed into the sleeves in any desired manner.

Another object of the invention is to provide an assembly of three such devices for supporting three sleeves arranged in a triangle, said sleeves being mechanically integrated by means of three tie members which are joined to the sleeves and a central compression element against which the three sleeves are supported.

In order that the invention may be more clearly understood, reference will now be made to the accompanying drawings which show some embodiments thereof by way of example, and in which:

FIGURE 1 shows a cross section of a first embodiment of sleeve anchorage.

FIGURE 2 shows a section along the line II—II of FIGURE 1.

FIGURE 3 shows a section along the line III—III of FIGURE 1.

FIGURE 4 shows a section along a plane indicated by line IV—IV of FIGURE 3.

FIGURE 5 shows a cross section through an assembly of three sleeves.

FIGURE 6 shows a longitudinal view of an assembly of three sleeves, and

FIGURE 7 shows a cross section through a detail of an insulating member shown in the anchorage according to FIGURE 5.

Referring now to the drawings, FIGURES 1 and 2 show a sleeve 21 surrounding a bar conductor 22 and encircled by a reinforcement member 23 of hoop formation which, in section, may have the shape of a U, and which is secured to the sleeve.

These reinforcement members are used to anchor the sleeve to the ground. At least two support members 24, for supporting the sleeve, are secured to the flanges of the reinforcing members, for example, by ears 25, 26 and 27. The support members 24 each have a bearing member having a depending portion 28 which has a part-cylindrical shape, the axis of which is parallel to that of the sleeve, as shown in FIGURE 4. The support members are secured to a plate 30 having a part-cylindrical depression 28a by a bolt 29 which passes through the member 28. The plate 30 rests on a stand 31 which can be in the form of a concrete block and wherein the bolt 29 is anchored. This block may alternatively consist of a sufficiently solid insulating material, and preferably rests upon a metal base 32 which should itself be fixed to the ground or to a beam. It is of sufficient height to provide a current leakage path offering the required insulating resistance. The support member 24 is fixed to the plate 30 by at least one flexible washer 33 compressed by two lock nuts 34 and 35. The result of this arrangement is that all the support members are located within the overall dimensions $a$, and $b$ while permitting point $c$ to be as close as possible to the ground (see FIGURE 1). The free expansion of the sleeve which brings about displacement of the support member 24 in relation to the stand 31 is accommodated by a gap 36 around the bolt 29 in the longitudinal direction of the sleeve only, as is seen in FIGURE 3.

The part-cylindrical shape 28 of the bearing member and of the corresponding depression 28a enables friction to be reduced by reducing the surface areas in contact, the said friction occurring when the sleeve expands in its longitudinal direction: this expansion may then take place under the most favourable conditions.

The device according to the invention allows two or more sleeves to be joined in an order appropriate for obtaining a unit with a high moment of inertia thus conferring upon it rigidity such as to make it possible to reduce the number of supports, and at the same time ensuring electrical insulation between the sleeves and to ground.

A possible embodiment of this arrangement, such as that shown in cross section in FIGURE 5 and in elevation in FIGURE 6, consists in connecting three sleeves 41, 42 and 43 by means of rods 44, 45, 46, 47, 48 and 49 connected in pairs by insulating members 50, 51 and 52. The sleeves are supported from the ground by means of anchorages 53, 54, similar to those described with reference to FIGURES 1, 2 and 3. These anchorages, and the rods 44, 49, are connected to hoops or reinforcement members 55, 56, 57, surrounding the sleeves. These reinforcement members should preferably be of a U-shaped section as in the previous case.

Rods 44 to 49 have threaded ends and are at one end bolted to ears which in turn are welded to the reinforcement members 55, 56, 57 whereas at the other end the rods are screwed to the insulating members 50, 51, 52 each comprising a member 58 containing two threaded sockets 59 and 60 (FIGURE 7).

The sleeves are tightened around a central member 71 which also ensures insulation between the sleeves and which is held fast between the sleeves by the tension of bars 44 and 49. This member may comprise shoes 61, 62 and 63 supported upon a common member 64 via insulators 65, 66, 67.

Such connections between the sleeves are located along the sleeves (FIGURE 6) in as many places as is appropriate in order to ensure the rigidity of the unit. The supports 53 and 54, analogous to those described with reference to FIGURES 1, 2 and 3, are placed appropriately to ensure support for the whole sleeve unit and may be interconnected. The result obtained by devices in accordance with the invention is that the distance between two supports of the known arrangement of sleeves is more than the distance which separates the triangulated connections thus bringing about a first economy, to which is added the elimination of all framework between the supports in question.

It is clear that the invention is not limited to the embodiments described herein, and that various modifications may be made to the specific details referred to. For example, it is possible to vary the shape, the disposition, the arrangement of the connections between the members 24 and 31, the shape of the insulators 50, the shape and arrangement of the central element 71, or the arrangement of the groups 55, 56 and 57 of FIGURE 6.

We claim:
1. An anchoring device for an electrical supply line that comprises an inner bar conductor and an outer sleeve surrounding said bar conductor, said anchoring device comprising a reinforcement member connected to said sleeve, a support member secured to said reinforcement member, said support member having a bearing member and said bearing member having a depending part which has a part-cylindrical shape having an aperture therein for the passage of a bolt but said aperture being enlarged in the longitudinal direction of said sleeve, a bolt passing through said aperture, a stand, and a plate member mounted on said stand and having a part-cylindrical depression thereon, said depending part of said bearing member fitting into said depression, said bolt being secured to said stand.

2. An anchoring device for an electrical supply line that comprises an inner bar conductor and an outer sleeve surrounding said bar conductor, said anchoring device comprising a reinforcement member of U-shaped cross-section surrounding and secured to said sleeve, the flanges of the U-shaped member projecting radially away from said sleeve, a support member secured to said flanges, said support member having a bearing member and said bearing member having a depending part which has a part-cylindrical shape having an aperture therein for the passage of a bolt but said aperture being enlarged in the longitudinal direction of said sleeve, a bolt passing through said aperture, a stand of insulating material, and a plate member mounted on said stand and having a part-cylindrical depression thereon, said depending part of said bearing member fitting into said depression, said bolt being secured to said stand.

3. An anchoring device for an electrical supply line that comprises an inner bar conductor and an outer sleeve surrounding said bar conductor, said anchoring device comprising a reinforcement member of U-shaped cross-section surrounding and secured to said sleeve, the flanges of the U-shaped member projecting radially away from said sleeve, a support member secured to said flanges, said support member having a bearing member and said bearing member having a depending part which has a part-cylindrical shape having an aperture therein for the passage of a bolt but said aperture being enlarged in the longitudinal direction of said sleeve, a bolt passing through said aperture, a stand of insulating material, a plate member mounted on said stand and having a part-cylindrical depression thereon, said depending part of said bearing member fitting into said depression, said stand being located beneath said U-shaped reinforcement member and within the vertical projections from said flanges of said reinforcement member, and said bolt being secured to said stand.

4. An anchoring device for three electrical supply lines arranged with their longitudinal axes in a triangular formation with one supply line uppermost and two lowermost, each of said lines comprising an inner bar conductor and an outer sleeve surrounding said bar conductor, said anchoring device comprising a plurality of reinforcement members each of U-shaped cross-section, each of said reinforcement members respectively surrounding and secured to one of said sleeves, the flanges of each U-shaped member projecting radially away from its respective sleeve, two support members respectively secured to the said flanges of the sleeves of the lowermost two of said supply lines, each of said support members having a bearing member and each of said bearing members having a depending part which has a part-cylindrical shape having an aperture for the passage of a bolt but said aperture being enlarged in the longitudinal direction of said sleeves, two bolts respectively passing through the apertures of said bearing members, two stands, one for each of said bearing members, two plate members respectively mounted one on each of said stands, and each plate member having a part-cylindrical depression thereon, each of said depressions respectively receiving the depending part of one of said bearing members, said bolts being respectively secured one to each of said stands, a plurality of tie members interconnecting said three sleeves, a central compression element located centrally of said triangular formation and means for respectively connecting each of said sleeves to said compression member.

References Cited in the file of this patent

UNITED STATES PATENTS

| | | |
|---|---|---|
| 2,151,298 | Miller | Mar. 21, 1939 |
| 2,533,370 | Haug | Dec. 12, 1950 |
| 2,739,773 | Rougemont | Mar. 27, 1956 |
| 2,970,185 | Swerdlow et al. | Jan. 31, 1961 |